United States Patent [19]

Shiohara

[11] Patent Number: 5,301,767
[45] Date of Patent: Apr. 12, 1994

[54] WIND INTRODUCING SYSTEM FOR MOTORCYCLE

[75] Inventor: Masakazu Shiohara, Iwata, Japan

[73] Assignee: Yamaha Hatsudoki Kabushiki Kaisha, Iwata, Japan

[21] Appl. No.: 964,196

[22] Filed: Oct. 21, 1992

[30] Foreign Application Priority Data

Oct. 21, 1991 [JP] Japan .................. 3-302383

[51] Int. Cl.⁵ ................... B60K 13/06; B62D 61/02
[52] U.S. Cl. ........................... 180/219; 180/229; 180/68.3; 280/288.2
[58] Field of Search .............. 180/219, 229, 68.1, 180/68.3, 219, 229, 68.1, 68.3; 280/288.2; 165/41, 44; 296/78.1, 208; 123/41.7

[56] References Cited

U.S. PATENT DOCUMENTS

| | | | |
|---|---|---|---|
| 4,577,720 | 3/1986 | Hamane et al. | 180/229 |
| 4,678,223 | 7/1987 | Kishi et al. | 180/219 X |
| 4,685,530 | 8/1987 | Hara | 180/219 |
| 4,703,825 | 11/1987 | Mikami et al. | 180/219 X |
| 4,709,774 | 12/1987 | Saito et al. | 180/229 |
| 4,830,135 | 5/1989 | Yamashita | 180/229 |
| 4,964,484 | 10/1990 | Buell | 180/219 |
| 4,982,973 | 1/1991 | Saito et al. | 180/229 X |
| 5,012,883 | 5/1991 | Hiramatsu | 180/219 X |

FOREIGN PATENT DOCUMENTS

61-205573  9/1986  Japan .
62-43993   3/1987  Japan .
2-123485  10/1990  Japan .

Primary Examiner—Margaret A. Focarino
Assistant Examiner—C. Mattix
Attorney, Agent, or Firm—Knobbe, Martens, Olson & Bear

[57] ABSTRACT

A motorcycle arrangement having a frame with an integral air inlet device that takes ram air and delivers it to the engine induction system. The frame air inlet device includes an enlarged portion that encircles components of the front wheel suspension so as to provide a large flow volume without interfering with the steering of the motorcycle.

22 Claims, 4 Drawing Sheets

WIND INTRODUCING SYSTEM FOR MOTORCYCLE

BACKGROUND OF THE INVENTION

This invention relates to a wind introducing system for a motorcycle and more particularly to an improved system for delivering cool ram air to the induction system of a motorcycle.

As is well known, the extremely compact nature of a motorcycle or motorcycle type of vehicle gives rise to a number of design problems. One of these problems is the supply of adequate cool atmospheric air to the engine for its combustion. This problem is made more acute when the engine of a motorcycle is wholly or partially water cooled. The reason for this is that the radiator should be positioned in a forward location so that it will receive adequate air for engine cooling. This normally positions the radiator to the front of the induction system for the engine. As a result, the air drawn into the induction system is heated by the radiator and the volumetric efficiency and performance of the engine can be deteriorated.

In addition, it is now the practice with many forms of motorcycles to provide at least partial cowling so as to improve the wind resistance of the motorcycle and also to offer added comfort to the rider. The addition of external cowling further complicates the problem of providing adequate cool air to the engine induction system.

A number of arrangements have been proposed for providing ram air ducts that will supply air to the engine induction system. These ram air ducts have forwardly placed air inlets for conveying air from a forward position under ram effect back to the engine induction system. However, by providing such separate ducting the construction of the motorcycle becomes more difficult and servicing can become a problem. In addition, such separate ducts frequently do not provide adequate volume so as to insure unrestricted air flow to the engine under all running conditions even if a ram effect is generated.

Arrangements have been provided where the cowling of the motorcycle itself forms an air duct for the induction system or wherein the frame is formed as an air duct for the induction system. Where these constructions are employed, however, either the shape of the cowling and/or the frame does not afford adequate air flow.

It is, therefore, a principal object of this invention to provide an improved air inductions system for a motorcycle.

It is a further object of this invention to provide an improved air induction system for a motorcycle type of vehicle wherein adequate air flow can be provided and separate ducting is not required.

It is a further object of this invention to provide an improved motorcycle and air induction system.

SUMMARY OF THE INVENTION

This invention is adapted to be embodied in a motorcycle type of vehicle having a frame assembly, at least one rear wheel carried by the frame assembly, an internal combustion engine supported by the frame assembly and driving the rear wheel, a front wheel and a front wheel suspension and steering arrangement for journaling the front wheel for rotation and for steering movement. The frame assembly includes an integral air delivery portion for delivering ram air to the engine. The air delivery portion of the frame is comprised of an atmospheric air inlet disposed in an area to receive high pressure air as the motorcycle is traveling and an air outlet for delivering air to the engine. The portion between the air inlet and the air outlet encircles a component of the front wheel suspension and steering arrangement for air flow there across without interfering with the steering of the front wheel.

DETAILED DESCRIPTION OF THE PREFERRED EMBODIMENT OF THE INVENTION

Figure 1:
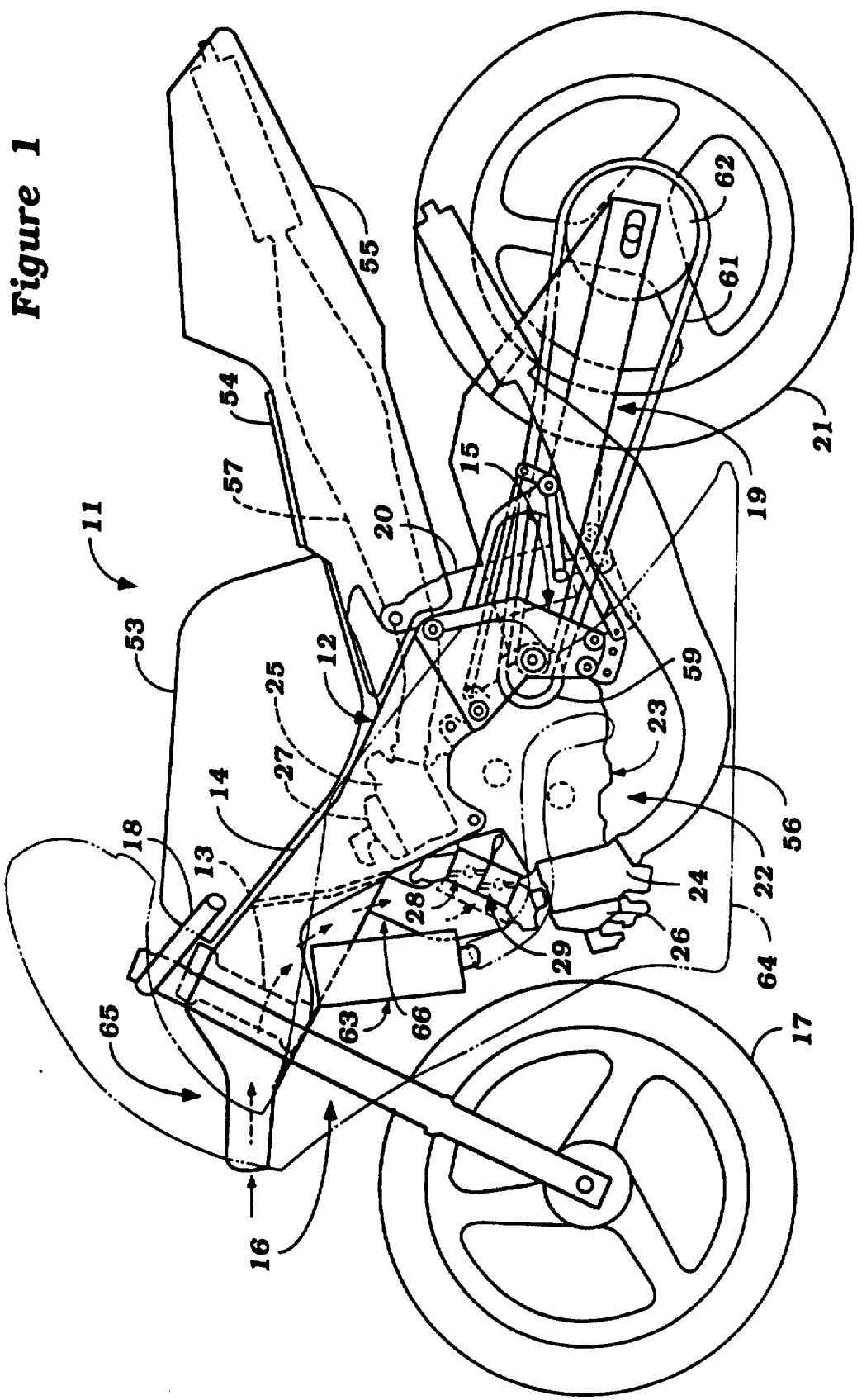
FIG. 1 is a side elevational view of a motorcycle constructed in accordance with an embodiment of the invention, with the body cowling shown in phantom to more clearly show the details of the construction.

Referring now in detail to the drawings and initially to FIG. 1, a motorcycle constructed in accordance with an embodiment of the invention is depicted and is identified generally by the reference numeral 11. The invention is particularly adapted for use in motorcycles or other vehicles of the motorcycle type. By "motorcycle type" reference is had to vehicles having a frame construction having a head pipe on which a front wheel is dirigibly supported. In addition to motorcycles per se, such vehicles may comprise three or four wheel off the road vehicles.

The motorcycle 11, as noted, has a frame assembly 12 that is comprised of a head pipe 13 and a pair of main frame members 14 which are affixed to the head pipe 13 and extend rearwardly and downwardly in a manner which will be described. At the rear end, these main frame members 14 are connected to a rear wheel suspension member 15 which may comprise a casting or weldment.

The head pipe 13 journals a front fork assembly 16 for steering movement about a generally vertically extending steering axis. A front wheel 17 is rotatably journaled at the lower end of the front fork assembly 16 and a handlebar assembly 18 is affixed to the upper end of the front fork assembly 16 for steering of the front wheel 17 in a known manner. If desired, the front fork assembly 16 may include a suspension arrangement for suspension travel of the front wheel 17 relative to the frame assembly 12.

A trailing arm 19 is pivotally connected at its front end to the rear suspension member 15 in a manner as described in my co-pending application entitled "Motorcycle", U.S. patent application Ser. No. 07/964,445, filed Oct. 21, 1992 and assigned to the Assignee hereof. The disclosure of that application is incorporated herein by reference inasmuch as the invention relates to the air flow system of the motorcycle 11. A rear wheel 21 is rotatably journaled at the rear end of the trailing arm assembly 19. A suspension element 20 is interposed between the trailing arm 19 and the frame assembly 12 for cushioning the suspension movement of the rear wheel 21.

An internal combustion engine, indicated generally by the reference numeral 22 is mounted in the frame assembly 12 in a known manner. In the illustrated embodiment, the engine 22 is of the V4, two-cycle, crankcase compression type and includes a crankcase member 23 from which a pair of cylinder banks 24 and 25 extend. Cylinders head 26 and 27 are affixed to the cylinder banks 24 and 25. The cylinder bank 24 is inclined at a slight downward angle to the horizontal while the cylinder bank 25 is inclined slightly forwardly to the vertical.

An induction system is provided for the engine 22 with the intake charge being inducted into the crankcase chambers of the engine 22, as is typical with two-cycle engine practice. This induction system includes a pair of upper throttle bodies 28 and a pair of lower throttle bodies 29 having a configuration as best seen in FIG. 2.

Figure 2:
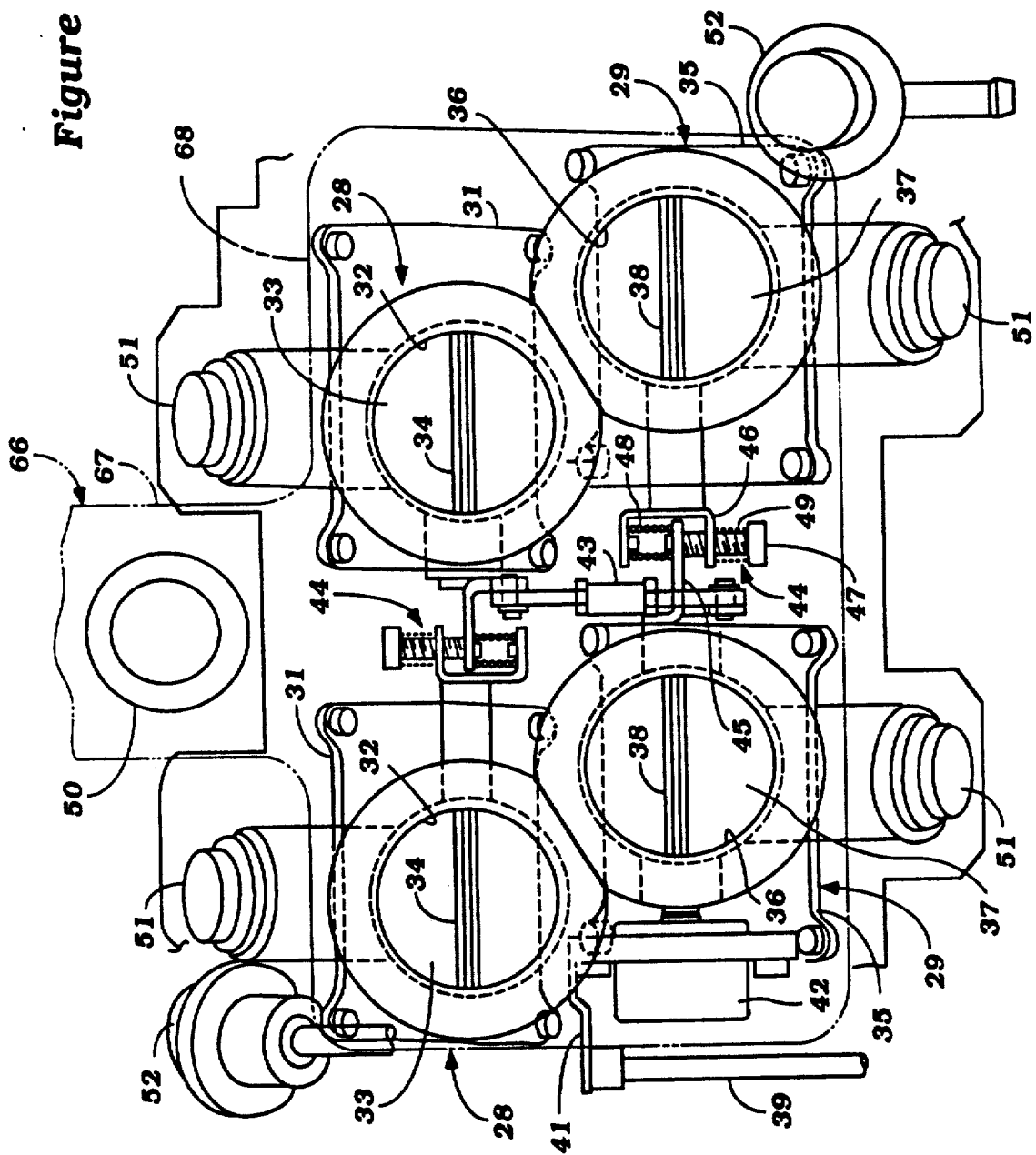
FIG. 2 is an enlarged front elevational view showing the throttle body arrangement for the induction system.

Referring specifically to FIG. 2, it will be seen that the upper throttle bodies 28 comprise mounting bases 31 that have upwardly extending trumpets or intakes 32. Throttle valves 33 are positioned within the air intake on respective throttle valve shafts 34. In a similar manner, the lower throttle bodies 29 comprise mounting flanges 35 that are affixed to the crankcase member 23 and which define air trumpets or inlets 36 in which throttle valves 37 are supported upon throttle valve shafts 38.

A throttle cable 39 is affixed at its remote end (not shown) to a suitable throttle actuator and operates a throttle control lever 41 that is fixed to one of the throttle valve shafts 39 of the lower throttle bodies 29. A throttle valve position sensor 42 cooperates with the lever 41 for providing a signal to an ECU for controlling the fuel supply to the engine and for other controls, as may be desired.

An adjustable link 43 connects the opposite end of the throttle valve shaft 38 operated by the cable 39 with one of the throttle valve shafts 34 of the upper throttle bodies 28. In the illustrated embodiment, this connection is to the opposite side upper throttle body 28 with the adjustable link 43 permitting synchronization between the throttle valve shafts 38 and 34 so interlinked.

Synchronizing mechanisms, indicated generally by the reference numeral 44 are interposed between the remaining two throttle valve shafts 34 and 38 of the upper and lower throttle bodies 28 and 29 so as to connect them and synchronize them. Each throttle synchronizing mechanism 44 includes a lever 45 that is affixed to the directly operated throttle valve shaft 38 or 34 and which has a tang that extends between a bifurcated lever 46 that is affixed to the other throttle valve shaft 38 or 34 of the respective pair. An adjusting screw 47 is threaded through one leg of the lever 46 and adjustably urges the tang of the lever 46 into engagement with a coil compression spring 48 so as to establish the desired relative positions of the throttle valve shafts of the pairs. A coil spring 49 also encircles the adjusting screw 47 to hold it in place so that it will not move under vibration.

In the illustrated embodiment, the engine 22 is also provided with a port type fuel injection system and for that purpose there are provided fuel injectors 51 which inject into the induction passages 33 or 36 of the respective lower and upper throttle bodies 29 and 28. Fuel is supplied to the fuel injectors 51 from a fuel tank, which will be described, by a pump 50 through a system that includes a pair of pressure regulators 52 for regulating the pressure of fuel supplied to the fuel injectors 51.

Referring again to FIG. 1, the fuel tank is illustrated and is identified by the reference numeral 53. The fuel tank 53 is mounted above the engine 22 and rearwardly of the head pipe 13. A seat 54 is mounted on a side cover 55 which, in turn, mounted in a suitable manner on the frame 12 rearwardly of the fuel tank 13.

A pair of lower exhaust pipes and exhaust systems 56 extend from the exhaust ports of the lower cylinder banks 24 and pass rearwardly along opposite sides of the frame and terminate at upwardly extending mufflers that discharge on opposite sides of the trailing arm 19. In a similar manner, a pair of upper exhaust pipes 57 extend rearwardly from the exhaust ports of the upper cylinder banks 25 and extend on opposite sides of the side cover 55 and terminate in muffler atmospheric exhaust discharges.

As is typical with motorcycle practice, the crankcase 23 of the engine 22 also encloses a change speed transmission as described in the aforenoted co-pending application which drives a stub output shaft 58 (FIG. 3) which, in turn, has affixed to its exposed end a driving sprocket 59. Referring again to FIG. 1, this driving sprocket 59 drives a chain 61 which, in turn, drives a driven sprocket 62 affixed to the rear wheel 21 for driving the rear wheel 21.

The engine 22 is at least partially water cooled and is provided with a pair of radiators 63 that are mounted in the frame in an appropriate manner on opposite sides of the front fork 16 so as to receive unobstructed air flow for cooling purposes. A cowling or body, shown in phantom and identified by the reference numeral 64 is provided for streamlining purposes and may be formed with appropriate air inlet openings so that cooling air may flow to the radiator 63.

Although this system provides effective cool air for the radiator 63, the positioning of the radiator 63 in front of the forwardly facing throttle bodies 28 and 29 will mean that heated air will be delivered to the throttle bodies 28 and 29 and decrease the volumetric efficiency and performance of the engine 22. To avoid this, there is provided an air intake system comprised of an integral frame air inlet, indicated generally by the reference numeral 65 which delivers cool ram air to an air inlet device 66 which, in turn, supplies this cool ram air to the throttle bodies 28 and 29. As may be seen in FIG. 2, the air inlet device 66 has an upwardly extending inlet portion 67 which communicates in a manner to be described with the frame air inlet 65 and a lower box like portion 68 that is affixed to and encircles the throttle bodies 28 and 29. If desired, an air filter (not shown) may be positioned within the air inlet device 66.

Figure 3:
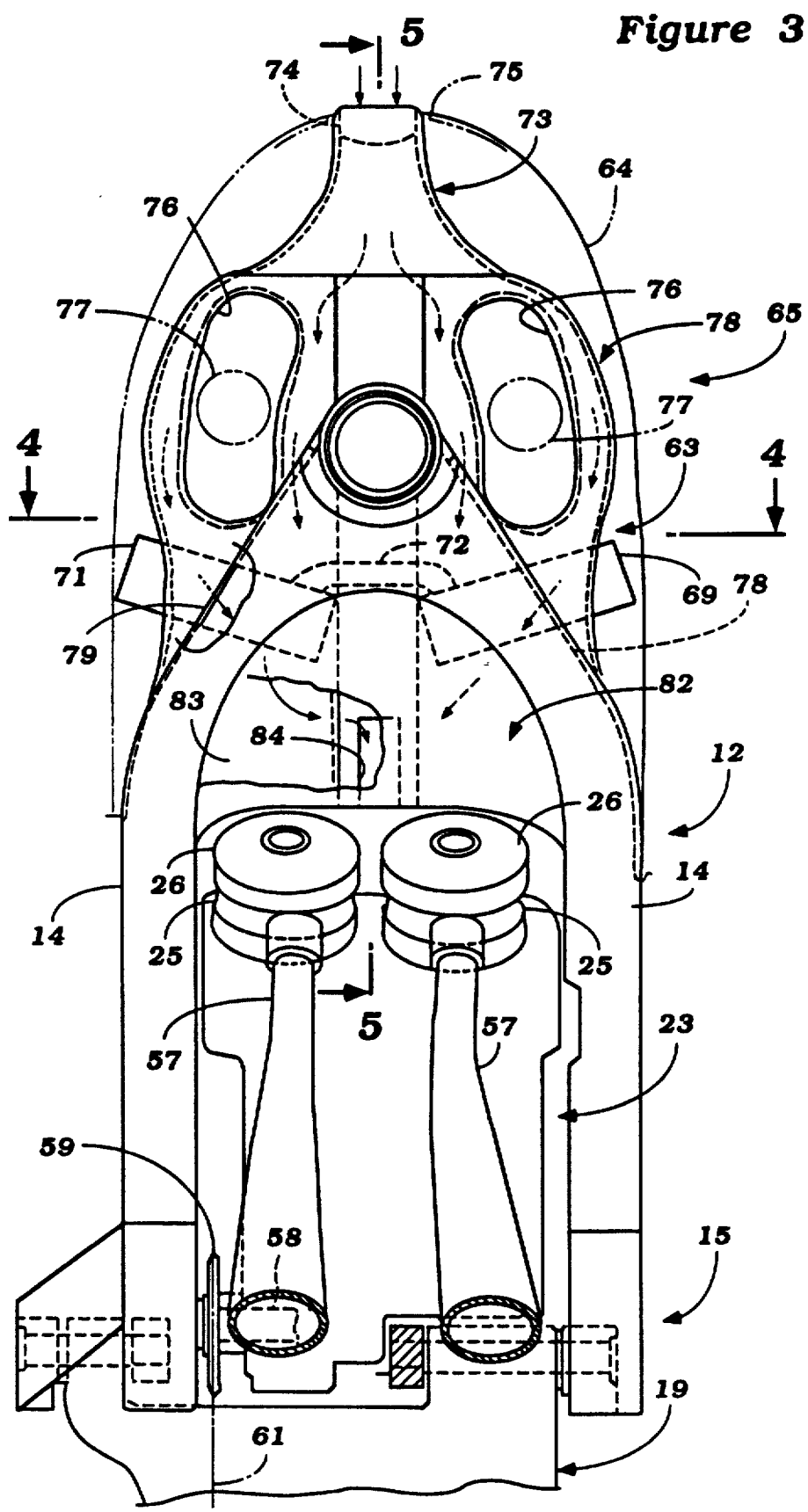
FIG. 3 is a top plan view of the motorcycle, with certain components removed and other components shown in phantom to more clearly show the construction.
Figure 4:
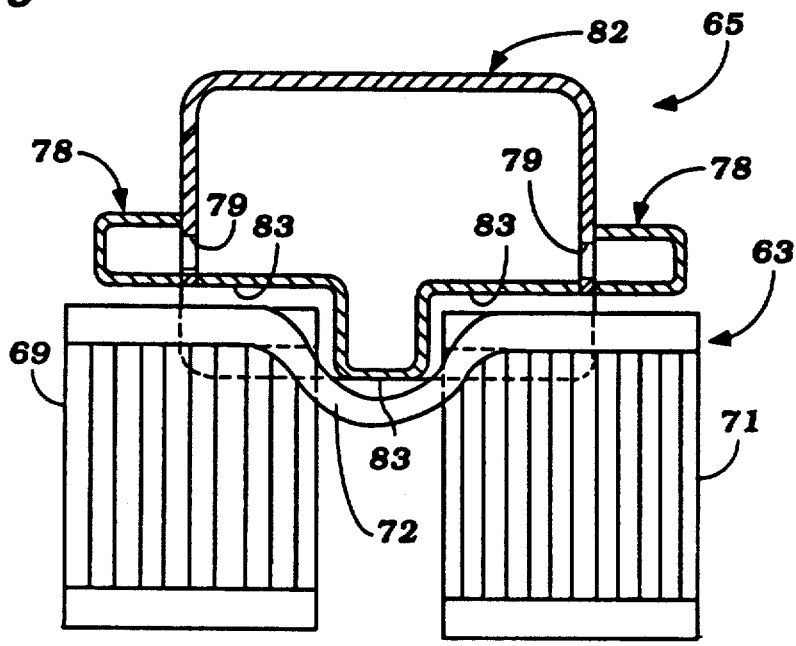
FIG. 4 is a cross sectional view taken along the line 4—4 of FIG. 3.
Figure 5:
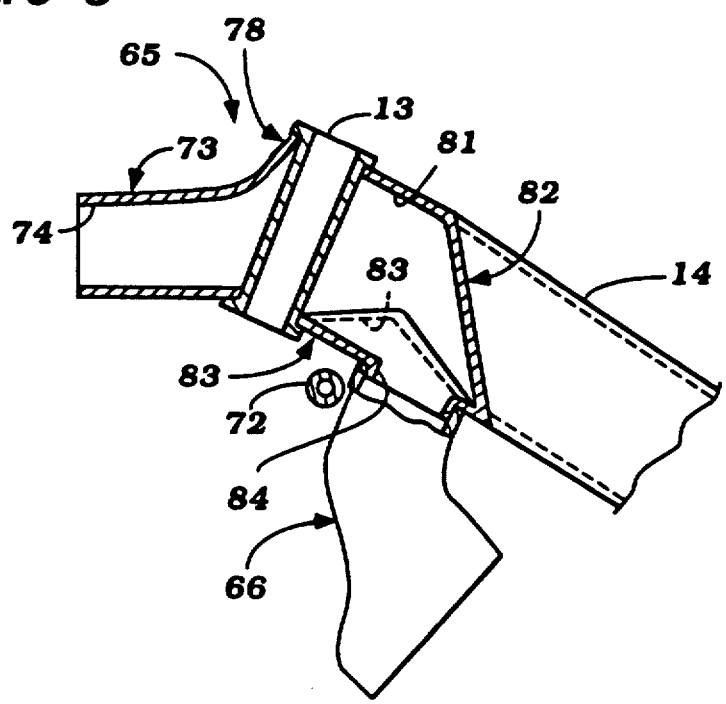
FIG. 5 is a cross sectional view taken along the line 5—5 of the FIG. 3.

The frame air inlet device 65 and the way in which it delivers air to the air inlet device 66 will now be described by particular reference to FIGS. 3 through 5. In FIGS. 3 and 4, the radiators 63 are shown in more detail and comprise a pair of radiators, as noted, which are indicated by the reference numerals 69 and 71 which are illustrated as being of the vertical flow type and which have their upper header tanks connected by a conduit 72. The lower header tanks are connected to the cooling system of the engine in an appropriate manner.

The air intake device 65 is of a welded construction and is comprised of an air inlet portion 73 that extends forwardly of the head pipe 13 and which has a forwardly facing air inlet opening 74 which extends through a corresponding opening 75 in the body cowling 64 so as to receive ram air as shown by the arrows in FIG. 3. It will be noted that the air inlet portion 73 increases in cross sectional area from the opening 74 in a rearward direction and then flares out into a pair of sections which define generally arcuate or elliptical shaped openings 76 which pass side portions 77 of the front fork assembly 16 so as to permit steering motion without interference from the air intake device 65. In this area, the air intake device also extends around the head pipe 13 and forms an enlarged intermediate portion 78 in which the openings 76 are formed. As a result of this enlargement in the volume, there will be no flow restrictions and, furthermore, the air may flow around the head pipe 13 and fork portions 77 so as to provide substantially unrestricted and free air flow back toward the induction system.

The main frame members 14 have a generally channel shape and their forward ends are formed with enlarged openings 79 which face in the direction of air flow so that the ram air will flow through these openings 79 and into a further air outlet chamber 81 that is formed by the main frame members 14 and a closure plate 82 that extends across them and defines the air outlet portion 81. A lower wall 83 is formed by the lower flanges of the main frame members 14 and the closure plate 82 so that the ram air which has entered the outlet opening 81 will be collected in this area. A discharge duct 84 is formed in this lower wall and the air inlet device is fitted around a flange formed by the discharge duct 84 so as to provide a good air seal and to deliver the ram air downwardly into the air inlet device 66 and to the throttle bodies 28 and 29.

It should be readily apparent from this description that the device is very effective in providing copious amounts of ram air that has not been heated by the radiator 63 for efficient operation of the engine 22. Also, the device is constructed in such a way that the front fork and steering mechanism is partially encircled but so that it does not in any way interfere with the air flow into the induction system.

It should be understood that the foregoing description is that of a preferred embodiment of the invention and that various changes and modifications may be made without departing from the spirit and scope of the invention, as defined by the appended claims.

I claim:

1. A motorcycle type of vehicle having a frame assembly, at least one rear wheel carried by said frame assembly, an internal combustion engine supported by said frame assembly and driving said rear wheel, a front wheel, and a front wheel suspension and steering arrangement for journaling said front wheel for rotation and for steering movement, said frame assembly including an integral air delivery device for delivering ram air to said engine, said air delivery device being comprised of an atmospheric air inlet disposed in an area to receive high pressure air as said motorcycle is traveling, an air outlet for delivering said air to said engine, and a portion between said air inlet and said air outlet encircling a component of said front wheel suspension and steering arrangement for air flow there around without interfering with the steering of said front wheel.

2. A motorcycle type of vehicle as set forth in claim 1 wherein the front wheel suspension and steering arrangement includes a head pipe formed by the frame assembly and a front fork supported for steering movement by said head pipe.

3. A motorcycle type of vehicle as set forth in claim 2 wherein the portion of the air delivering device encircling the component encircles the head pipe.

4. A motorcycle type of vehicle as set forth in claim 2 wherein the portion of the air delivery device encircles the front fork.

5. A motorcycle type of vehicle as set forth in claim 4 wherein the front fork has a pair of spaced apart sections.

6. A motorcycle type of vehicle as set forth in claim 5 wherein both of the spaced apart sections of the front fork are encircled by the portion of the air delivery device.

7. A motorcycle type of vehicle as set forth in claim 6 wherein the head pipe is also encircled by the portion of the air delivery device.

8. A motorcycle type of vehicle as set forth in claim 2 wherein the engine is provided with an induction system.

9. A motorcycle type of vehicle as set forth in claim 8 wherein the air outlet delivers air to the engine induction system.

10. A motorcycle type of vehicle as set forth in claim 9 wherein the air outlet communicates with a further separate duct that delivers the air to the induction system.

11. A motorcycle type of vehicle as set forth in claim 8 wherein the engine is at least partially water cooled and further including a radiator for dissipating heat from the engine, said radiator being positioned forwardly of the engine induction system.

12. A motorcycle type of vehicle as set forth in claim 11 wherein the air outlet delivers air to the induction system without passing across the radiator.

13. A motorcycle type of vehicle as set forth in claim 12 wherein there are a pair of radiators mounted on opposite sides of the head pipe and rearwardly of the head pipe.

14. A motorcycle type of vehicle as set forth in claim 2 wherein the engine is at least partially water cooled and includes a radiator for dissipating heat from the water coolant.

15. A motorcycle type of vehicle as set forth in claim 14 wherein the air outlet delivers air to an induction system of the engine without passing across the radiator.

16. A motorcycle type of vehicle as set forth in claim 15 wherein there are a pair of radiators mounted on opposite sides of the head pipe and rearwardly of the head pipe.

17. A motorcycle type of vehicle as set forth in claim 2 further including a cowling assembly extending forwardly of the head pipe.

18. A motorcycle type of vehicle as set forth in claim 17 wherein the cowling assembly is provided with an opening in registry with the air inlet of the air delivery device of the frame.

19. A motorcycle type of vehicle as set forth in claim 18 wherein the air inlet extends forwardly of the head pipe.

20. A motorcycle type of vehicle as set forth in claim 1 wherein the frame assembly includes a head pipe and a pair of main frame members.

21. A motorcycle type of vehicle as set forth in claim 20 wherein the air delivery portion is comprised of a forwardly extending air inlet, an intermediate device that encircles the head pipe and is formed partially by the main frame members and a closure plate affixed thereto.

22. A motorcycle type of vehicle as set forth in claim 21 further including a duct affixed to the air outlet and delivering the air to the engine.

* * * * *

UNITED STATES PATENT AND TRADEMARK OFFICE
CERTIFICATE OF CORRECTION

PATENT NO. : 5,301,767
DATED : April 12, 1994
INVENTOR(S) : Masakazu Shiohara

It is certified that error appears in the above-indentified patent and that said Letters Patent is hereby corrected as shown below:

Column 6, line 2, Claim 2, "delivering" should be "delivery".

Column 6, line 24, Claim 10, "duot" should be "duct".

Column 6, line 60, Claim 21, "portion" should be "device".

Column 6, line 62, Claim 21, "device" should be "portion".

Signed and Sealed this

Twenty-third Day of August, 1994

BRUCE LEHMAN

Attest:

Attesting Officer        Commissioner of Patents and Trademarks